United States Patent [19]

Nishikawa et al.

[11] Patent Number: 4,757,395
[45] Date of Patent: Jul. 12, 1988

[54] WAVEFORM EQUALIZING CIRCUIT

[75] Inventors: Keiichi Nishikawa; Yuji Ohmura, both of Kamakurashi, Japan

[73] Assignee: Mitsubishi Denki K.K., Tokyo, Japan

[21] Appl. No.: 944,935

[22] Filed: Dec. 22, 1986

[30] Foreign Application Priority Data

May 20, 1986 [JP] Japan ............................... 61-115511

[51] Int. Cl.$^4$ ........................... G11B 5/09; G11B 5/03
[52] U.S. Cl. ......................................... 360/46; 360/65
[58] Field of Search ...................... 360/45, 46, 65, 68; 333/18, 28 R

[56] References Cited

U.S. PATENT DOCUMENTS 4,633,200 12/1986 Adler .................................... 360/65

OTHER PUBLICATIONS

Y. Ouchi et al., Improvement of Phase Margin by Asymmetric Waveform Equalizer and Write Compensation, the National Convention Record 1984, the Institute of Electronics and Communication Engineers of Japan, 216.

Primary Examiner—Vincent P. Canney
Attorney, Agent, or Firm—Takeuchi Patent Office

[57] ABSTRACT

In order to reduce the interference of readout signal waves that increases with the recording density in a magnetic disk device, the readout circuit is provided with a waveform equalizing circuit consisting of a resistance circuit, a delay line, and a differential amplifier to produce a signal advanced by a certain time and attenuated by a certain degree and a signal delayed by a certain time and attenuated by a certain degree. These signals are subtracted from the original signal to decrease the half-value width of the readout signal, thus reducing the interference between the waves. However, these conventional attenuation factors of the advanced and delayed signals cannot be changed freely so that the half-value width of a readout signal cannot fully be decreased without increasing the undershoot in the head or tail portion. Thus, an inverse signal applying circuit is provided to apply the inverted signal to the other end of the resistance circuit to allow complete control of the attenuation factors of the advanced and delayed signals, respectively.

3 Claims, 5 Drawing Sheets

UNDERSHOOT

WAVEFORM EQUALIZING CIRCUIT

BACKGROUND OF THE INVENTION

1. Field of the Invention

The present invention relates to a waveform equalizing circuit for shaping the waveform of a signal read out by the head of a recorder or the like to enhance the reliability of the readout data.

2. Description of the Prior Art

When information is recorded in a magnetic disk device at recording densities above the appropriate level, interference of the readout signals can take place, lowering the voltage level or shifting the pattern peak, resulting in lowered accuracy or reliability of the signal detection. For this reason, a waveform equalizing circuit has been used in the readout circuit to decrease the half-value width, thereby reducing the waveform interference and the degree of the above voltage drop or pattern peak shift.

FIG. 3 shows an example of the prior-art waveform equalizing circuit described in the National Convention Record 1979, the Institute of Electronics and Communication Engineers of Japan, 201. A delay line 2 having a delay time $\tau$ and a characteristic impedance Ro is connected to the positive terminal of a differential amplifier 1 having a very large input impedance. A signal source 3 equivalent to the readout signal of a magnetic head is connected to the delay line 2 through a resistance circuit 4 consisting of the first, second, and third resistors 4a, 4b, and 4c, having resistance Ra, Rb, and Rc, respectively. These resistors not only determine the attenuation factor K but also serve as a matching circuit with the characteristic impedance Ro of the delay line 2.

In operation, suppose a solitary wave E(t) is fed to the waveform equalizing circuit from the signal source 3. E(t) is generally expressed in terms of the differential arc tangent as follows:

$$E(t) = 1/\{1 + (t/W_{50})^2\} \quad (1)$$

where W is the half-value width or the time width of the solitary wave at which its voltage level is 50% of the peak value.

When this signal E(t) is fed to the delay line 2, the voltage Ea(t) at the matching terminal a is given by $$Ea(t) = \{E(t) + E(t-2\tau)\} \times (Rb+Rc)/2 \cdot (Ra+Rb+Rc) \quad (2)$$

This voltage Ea(t) is divided by the resistors 4b and 4c to provide a voltage Eb given by $$Eb(t) = \{E(t) + E(t-2\tau)\} \times Rc(Rb+Rc)/2(Rb+Rc) \cdot (Ra+Rb+Rc) \quad (3)$$

which is fed to the negative terminal b of the differential amplifier 1. The reflection end c of the delay line 2 is not matched with the characteristic impedance Ro or forms an open end, and so a signal fed at the matched terminal a is totally reflected at the reflection end c with the delay time $\tau$. The magnitude of the voltage produced at the reflection end c is twice that of the signal voltage.

When E(t) is fed from the signal source 3, the voltage Ec(t) applied to the positive terminal c of the differential amplifier 1 is given by $$Ec(t) = E(t-\tau)(Rb-Rc)/(Ra+Rb+Rc) \quad (4)$$

Consequently, the voltage Ed(t) obtained at the output terminal d of the differential amplifier 1 is given by $$Ed(t) = Go\{Ec(t)Eb(t)\} \quad (5)$$

$$= Go(Rb + Rc)/(Ra + Rb + Rc) \times \quad (6)$$
$$[E(t - \tau) - \{E(t) + E(t - 2\tau)\} \times$$
$$Rc/2(Rb + Rc)]$$

where Go is the gain of the differential amplifier 1. Letting $$K = Rc/2(Rb+Rc) \quad (7)$$

$$G = Go(Rb+Rc)/(Ra+Rb+Rc) \quad (8)$$

$$t_1 = t - \tau \quad (9)$$

then, Eq. (6) is written as $$Ed(t_1+\tau) = G[E(t_1) - K\{E(t_1+\tau) + E(t_1-\tau)\}] \quad (10)$$

Eq. (10) represents the output signal from the waveform equalizing circuit, indicating that this waveform equalizing circuit puts out a signal G times as large as the difference between the input signal E(t) and the sum of the delayed signal $E(t-\tau)$ and the advanced signal $E(t+\tau)$ multiplied by the attenuation factor K.

This waveform equalizing effect is shown in FIG. 4. L, M, and N represent the input solitary waveform having the half-value width $W_{50}$, the signal advanced for the time $\tau$ and having the magnitude K times as large as the input signal, and the signal delayed with the time $\tau$ and having the magnitude K times as large as the input signal, respectively. O represents the equalized solitary waveform or the difference between the signal L and the signals M and N, indicating that the half-value width after the equalization is smaller than before the equalization.

The above circuit is useful for symmetrical solitary waveforms such as hown in FIG. 4, which are usually obtained from a ferrite magnetic head or the like, to reduce the half-value width. However, when it is used for an asymmetrical solitary waveform with an undershoot, such as shown in FIG. 5, which is usually obtained from a thin-film head or the like, the equalized waveform has an increased undershoot at its head and/or tail portion because both attenuation factors for the advanced and delayed signals M and N are equal, and these undershoots sometimes have been mistaken as peaks by the peak detector.

Consequently, for a solitary waveform with an undershoot at its tail portion as shown in FIG. 6, a waveform equalizing circuit having a termination resistor 5 with resistance RL at the reflection end c of the delay line 2 as shown in FIG. 7 has been used. When a voltage E(t) is fed from the signal source 3, the voltage Ec(t) generated at the reflection end c is given by $$Ec(t) = E(t-\tau)\{(1+(RL-Ro)/(RL-Ro)\} \times (Rb+Rc)/2(Ra+Rb+Rc) \quad (11)$$

Since the input signal and reflected signal are combined at the matched end a, the voltage Ea(t) generated at the matched end is given by $$Ea(t) = \{E(t) + E(t-2\tau)(RL-Ro)/(RL+Ro)\} \times (Rb+Rc)/2(Ra+Rb+Rc) \quad (12)$$

This voltage Ea(t) is divided by the resistors 4b and 4c to provide the negative terminal b of the differential amplifier 1 with a voltage Eb(t) given by $$Eb(t) = \{E(t) + E(t-2\tau)(RL-Ro)/(RL+Ro)\} \times Rc(Rb+Rc)/(Rb+Rc)(Ra+Rb+Rc) \quad (13)$$

Thus, the voltage Ed(t) generated at the output terminal d of the differential amplifier 1 is given by $$Ed(t) = Go[E(t-\tau)\{1+(RL-Ro)/(RL-Ro)\} - E(t)Rc/(Rb+Rc) - E(t-2\tau) \times Rc(RL-Ro)/(Rb+Rc)(RL-Ro)] \quad (14)$$

where Go is the gain of the differential amplifier 1. Letting $$G = Go\{1+(RL-Ro)/(RL-Ro)\} \times (Rb+Rc)/2(Ra+Rb+Rc) \quad (15)$$

$$K_1 = Rc/(Rb+Rc)\{1+(RL-Ro)/(RL+Ro)\} \quad (16)$$

$$K_2 = Rc(RL-Ro)/(Rb+Rc)(RL+Ro)/\{1+(RL-Ro)/(RL+Ro)\} \quad (17)$$

$$t_1 = t-\tau \quad (18)$$

then, Eq. (14) is expressed as $$Ed(t_1+\tau) = G\{E(t_1) - K_1 E(t_1+\tau) - K_2 E(t_1-\tau)\} \quad (19)$$

That is to say, the output signal from the waveform equalizing circuit of FIG. 7 is equalt to G times as large as the difference between the original signal E(t) and the sum of the advanced signal multiplied by $K_1$ and the delayed signal multiplied by $K_2$ which is smaller than $K_1$. This waveform equalizing effect is also shown in FIG. 6. L, M, N, and O represent the asymmetric solitary waveform, the signal advanced by $\tau$ and multiplied by $K_1$, the signal delayed by $\tau$ and multiplied by $K_2$, and the equalized solitary waveform, respectively. Thus, the undershoot of the equalized waveform is controlled by decreasing the value of $K_2$ while the half-value width is reduced.

FIG. 8 shows a waveform having an undershoot at its head portion. When the waveform equalizing circuit of FIG. 3 or 7 is used for this waveform, the head undershoot is increased so that it can be mistaken as a peak in the peak detection stage. When the head undershoot increase is suppressed, the half-value width cannot be decreased satifactorily. When the half-value width is decreased satisfactorily, this prior art waveform equalizing circuit increases the head undershoot of a readout solitary waveform, thus presenting a new problem of detection of the pseudo peak.

SUMMARY OF THE INVENTION

It is an object of the invention to provide a waveform equalizing circuit for decreasing the half-value width of a readout signal waveform with an undershoot in its head portion, thus reducing the wave interference and improving the peak shift.

Other objects, features, and advantages of the invention will be apparent from the following description with reference to the accompanying drawings.

DESCRIPTION OF THE PREFERRED EMBODIMENTS

Figure 1:
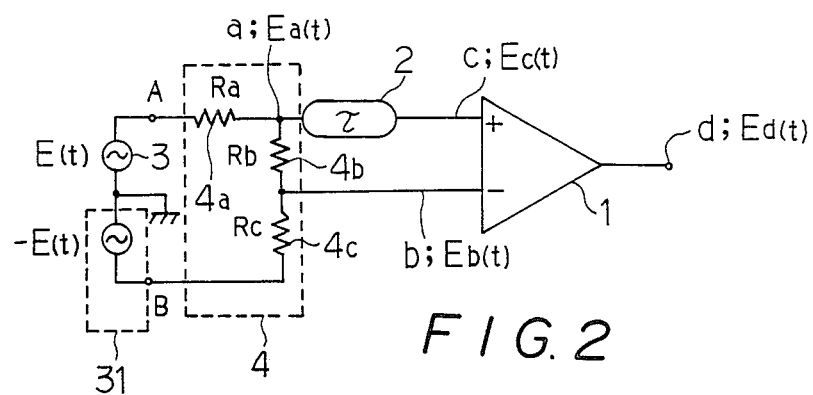
FIG. 1 is a schematic diagram of a waveform equalizing circuit embodying the present invention.

Referring now to FIG. 1 there is shown a waveform equalizing circuit embodying the present invention, which includes an inverted signal applying circuit 31 to invert the phase of a readout signal and apply the phase inverted signal to the end of a resistance circuit 4. The members identical with the conventional ones will be given the same numbers, and their description will be omitted. A readout signal from a signal source 3 is fed through the first resistor 4a, but the phase-inverted readout signal is fed through the third resistor 4c.

In operation, the characteristic impedance Ro of a delay line 2 is matched at a matching end a of the resistance circuit 4, and so $$Ro = Ra(Rb+Rc)/(Ra+Rb+Rc) \quad (20)$$

where Ra, Rb, and Rc are the resistances of the resistors 4a, 4b, and 4c, respectively. When a pair of signals E(t) and $-$E(t), which are opposite in phase, are fed to the waveform equalizing circuit at its input terminals A and B, respectively, the voltage Ea applied to the matching end a of the delay line 2 is given by $$Ea(t) = E(t)(Rb+Rc-Ra)/2(Ra+Rb+Rc) \quad (21)$$

The voltage Eb(t) applied to the negative input terminal b of the differential amplifier 1 is given by $$\begin{aligned} Eb(t) = {} & E(t) \{Rc(Rb + Rc - Ra)/2(Rb + Rc) \times \\ & (Ra + Rb + Rc) - Rb/(Rb + Rc)\} + \\ & E(t - 2\tau)Rc(Rb + Rc - Ra)/2(Rb + Rc) \times \\ & (Ra + Rb + Rc) \end{aligned} \quad (22)$$

The signal input at the matching end a is totally reflected at the reflection end c of the delay line 2 with a delay time $\tau$, and so the voltage Ec(t) at the reflection end c is twice in magnitude the voltage Ea(t) input at the matching end a and given by $$Ec(t) = E(t-\tau)(Rb+Rc-Ra)/(Ra+Rb+Rc) \quad (23)$$

Letting $$A = (Rb+Rc-Ra)/2(Ra+Rb+Rc) \quad (24)$$

Eqs. (22) and (23) are simplified as $$Eb(t) = \{E(t) + E(t-2\tau)\}ARc/(Rb+Rc) - E(t)Rb/(Rb+Rc) \quad (25)$$

$$Ec(t) = 2A\,E(t-\tau) \quad (26)$$

The voltage Ed(t) obtained at the output terminal d of the differential amplifier 1 is given by $$Ed(t) = Go\{2A\,E(t-\tau) - E(t)(ARc-Rb)/(Rb+Rc) - E(t-2\tau)ARc/(Rb+Rc) \quad (27)$$

where Go is the gain of the differential amplifier 1. Letting the attenuation factors, etc. be $$K_1 = (Rc - Rb/A)/2(Rb+Rc) \quad (28)$$

$$K_2 = Rc/2(Rb+Rc) \quad (29)$$

$$t_1 = t - \tau \quad (30)$$

$$G = 2AGo \quad (31)$$

the output signal Ed(t) is given by $$Ed(t+\tau) = G\{E(t_1) - K_1 E(t_1+\tau) - K_2 E(t_1-\tau)\} \quad (32)$$

Eq. (32) represents the output signal from the waveform equalizing circuit of FIG. 1 and indicates that it is proportional to the difference between the original signal and the sum of the advanced signal multiplied by $K_1$ and the delayed signal multiplied by $K_2$.

Figure 2:
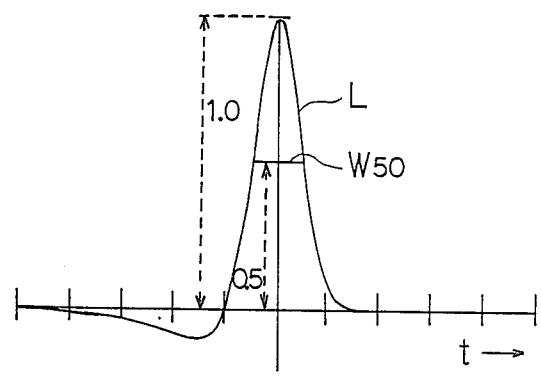
FIG. 2 is a graph showing the waveform equalizing effect by the waveform equalizing circuit of FIG. 1.
Figure 2:
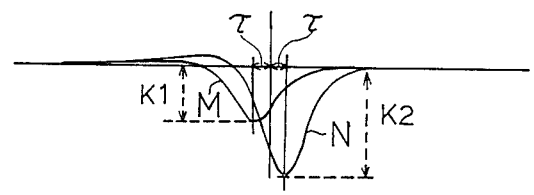
Figure 2:
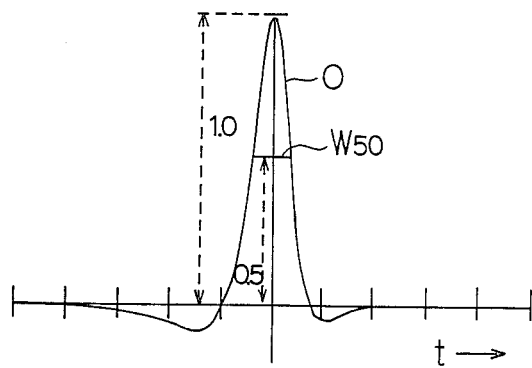
Figure 3:
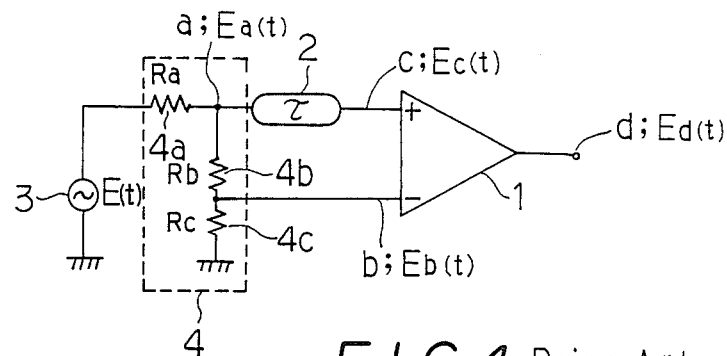
FIG. 3 is a schematic diagram of a waveform equalizing circuit according to the prior art.
Figure 4:
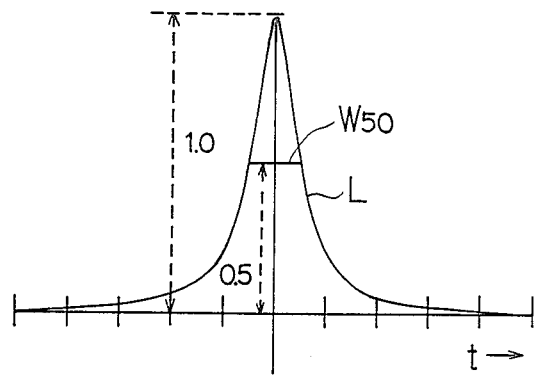
FIG. 4 is a graph showing the waveform equalizing effect by the waveforms eualizing circuit of FIG. 3.
Figure 4:
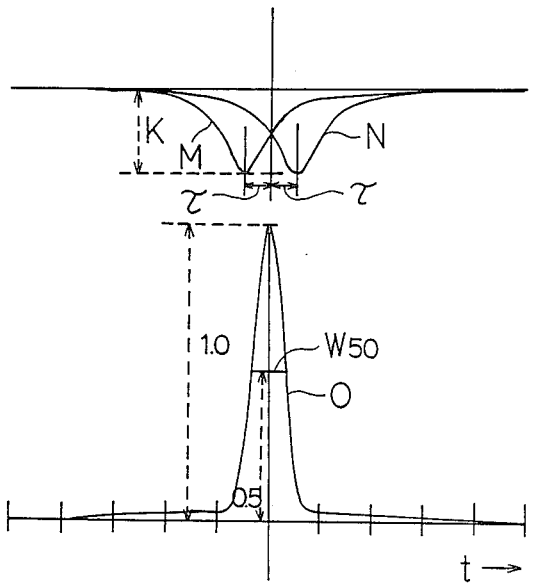
Figure 5:
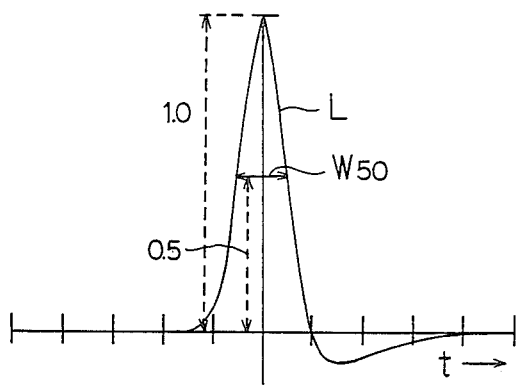
FIG. 5 is a graph showing the waveform equalizing effect of the waveform equalizing circuit of FIG. 3 when the input solitary wave has an undershoot in its tail portion.
Figure 5:
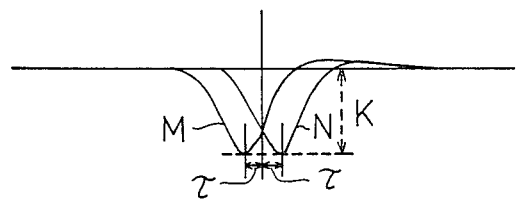
Figure 5:
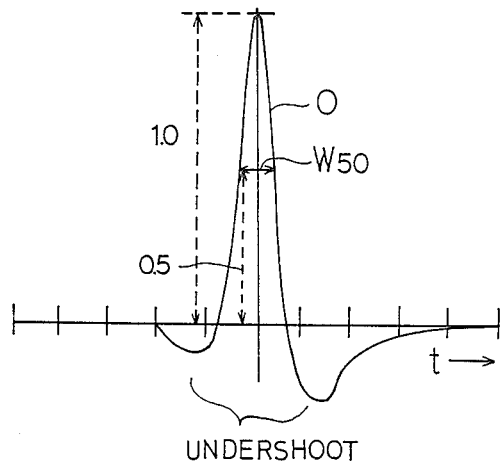

FIG. 2 shows signal waveforms at respective points of the waveform equalizing circuit. L is the solitary wave applied to the input terminals A and B of the waveform equalizing circuit and having an undershoot in its head portion and a half-value width $W_{50}$, M is the signal advanced by the time $\tau$ from the original signal F and multiplied by the attenuation factor $K_1$, N is the signal delayed by the time $\tau$ from the original signal L and multiplied by $K_2$, and O is the equalized solitary wave obtained at the output terminal d of the differential amplifier 1.

Figure 6:
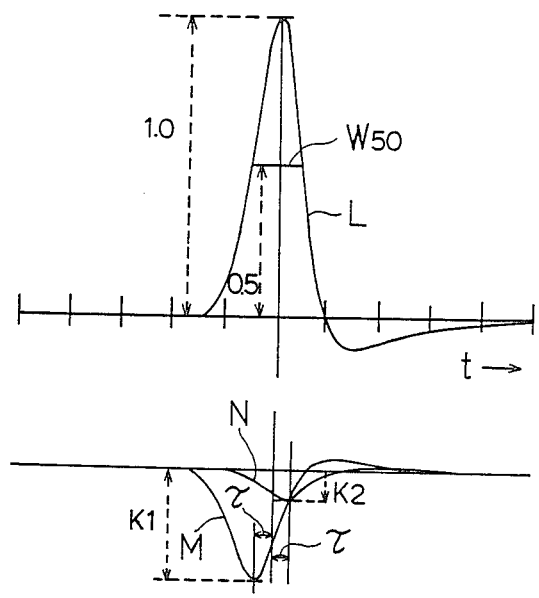
FIG. 6 is a graph showing the waveform equalizing effect by another waveform equalizing circuit according to the prior art.
Figure 6:
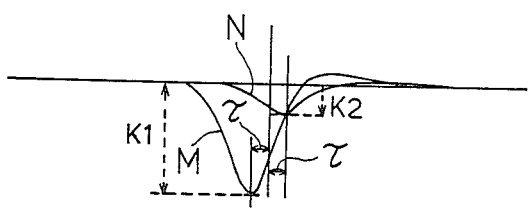
Figure 6:
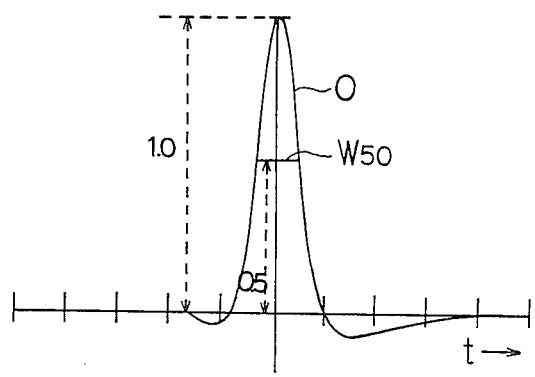
Figure 7:
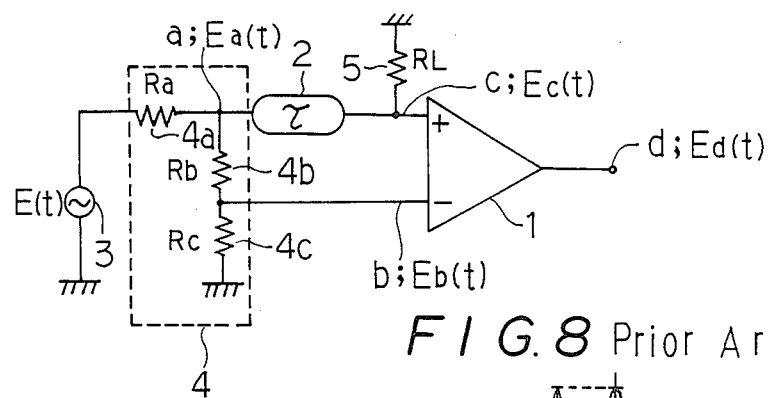
FIG. 7 is a schematic diagram of the waveform equalizing circuit that is used to produce the waveform equalizing effect of FIG. 6.
Figure 8:
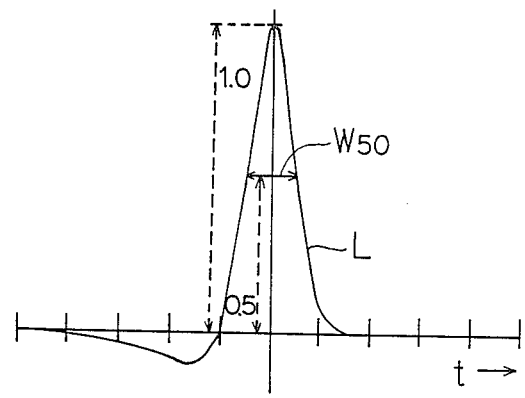
FIG. 8 is a graph showing the waveform equalizing effect by the waveform equalizing circuit of FIG. 7 when the input waveform has an undershoot in its head portion.
Figure 8:
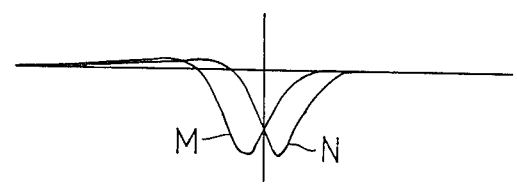
Figure 8:
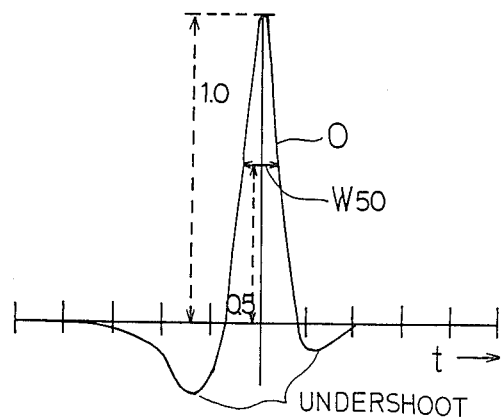

With this waveform equalizing circuit it is possible to make $K_1$ smaller than $K_2$ so that the half-value width of such a solitary wave with an undershoot in its head portion as shown in FIG. 2 can be decreased without any problem. The attenuation factor $K_2$ may also be made smaller than $K_1$ by making A of Eq. (24) negative, producing the same effect as the prior art circuit as shown in FIGS. 6 and 7. Of sourse, the resistance circuit 4 consisting of the resistors 4a, 4b, and 4c may be made by connecting different numbers of resistors. In addition to the reduction in the half-value width $W_{50}$, this waveform equalizing circuit may be used to eliminate the undershoots by, for example, making the attenuation $K_1$ negative.

As has been described above, the waveform equalizing circuit according to the invention has an inverted signal applying circuit to invert the phase of a readout signal and apply the phase inverted signal to the end of a resistance circuit so that the half-value width of the readout signal with an undershoot in its head portion may be decreased thereby to reduce the peak shift, providing reliable processing of the reproduced signal.

While the present invention has been illustrated and described in conjunction with a single preferred embodiment thereof, it is to be understood that numerous changes and modifications may be resorted to without departing from the spirit and scope of the present invention as defined in the appended claims.

What is claimed is:

1. A waveform equalizing circuit for shaping the waveform of a readout signal to reduce the interference of the signal waves that increase with recording density, which comprises:

a resistance circuit having first and second end points and intermediate junction points therebetween, such readout signal being applied to said first end point;

a delay line having a first end connected to a first junction of said resistance circuit the location of which junction results in a substantial match of the characteristic impedance of said delay line to said resistance circuit;

a differential amplifier the positive terminal of which is connected to the opposite end of said delay line and the negative terminal of which is connected to a second junction of said resistance circuit the location of which junction determines the attenuation factor of said equalizing circuit; and a circuit for applying to said second end point of said resistance circuit a second input signal consisting of a phase-inverted replica of such readout signal, whereby opposed phase-inverted versions of such readout signal, as modified by the intervening circuitry, are applied to the respective oppositely-poled and inherently relatively inverting terminals of said differential amplifier to elicit therefrom an equalized output irrespective of both the direction of or absence of asymmetry in such readout signal.

2. A waveform equalizing circuit as recited in claim 1, wherein said resistance circuit is a series circuit of a first resistor to which said readout signal is applied, a second resistor, and a third resistor to which said phase inverted signal is applied;

said first junction lying between said first and second resistors and being connected to said differential amplifier through said delay line; and said second junction lying between said second and third resistors and being connected to the negative terminal of said differential amplifier.

3. A waveform equalizing circuit as recited in claim 2, wherein the sum of the resistance of said second and third resisors multiplied by that of said first resistor and divided by the sum of the resistances of said first, second and third resistors is equal to the characteristic impedance of said delay line.

* * * * *